Figures 1, 2, 3:
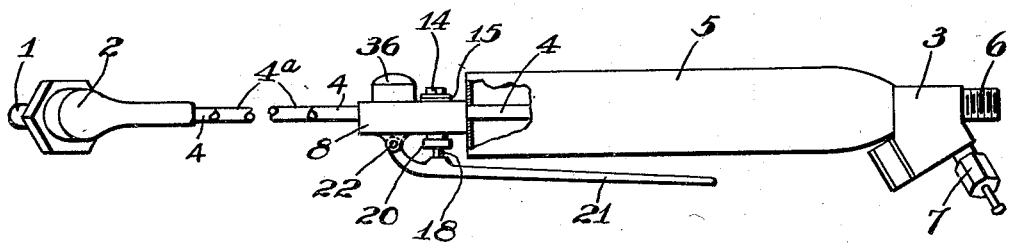

May 24, 1932.  J. D. McCUTCHEON  1,860,046
CUTTING TORCH
Filed Oct. 20, 1928

WITNESSES
A B Wallace
Edwin O. Johns

INVENTOR
James D. McCutcheon
By Brown & Critchlow
his Attorneys.

Patented May 24, 1932

1,860,046

UNITED STATES PATENT OFFICE

JAMES D. McCUTCHEON, OF PITTSBURGH, PENNSYLVANIA

CUTTING TORCH

Application filed October 20, 1928. Serial No. 313,825.

This invention relates to torches, and especially to cutting and welding torches adapted to deliver heating and cutting jets.

In the torches heretofore commonly used the pressure of cutting gas supplied to the nozzle to form the cutting jet has been regulated only by means of a pressure reducing valve situated between the control valve and the cutting gas supply, and consequently when the control valve is wide open gas is supplied to the nozzle at the maximum pressure for which the reducing valve is set. Adjustment of the cutting gas pressure is thus wholly within the control of the operator, who may set the reducing valve to deliver such gas at what he deems to be the proper pressure for the work in hand. Torch operators, through carelessness, haste, lack of experience, etc. may, and frequently do, improperly adjust the line pressure to supply too much cutting gas, with the result that cutting gas consumption is unnecessarily and wastefully increased.

An object of the invention is to provide a torch of the type referred to with means for automatically maintaining the flow of cutting gas to the nozzle below a predetermined pressure irrespective of the line pressure or pressure of the gas flowing to the cutting gas conduit from the control valve.

Another object is to provide a torch with means effective between the cutting gas control valve and nozzle for reducing the flow of gas to the nozzle when the pressure of the gas from the valve exceeds a predetermined value, which means are sealed to prevent change of adjustment.

The preferred embodiment of the invention is shown in the accompanying drawings, in which Fig. 1 is a plan view partly in section of a torch embodying the invention; Fig. 2 an enlarged vertical longitudinal sectional view of the control mechanism of the torch shown in Fig. 1; and Fig. 3 a cross section of the regulating valve, taken on line III—III, Fig. 2.

The torch provided by the invention comprises a nozzle adapted to deliver heating and cutting jets, separate conduits for supplying heating and cutting gases to the nozzle, a control valve in the cutting gas conduit, and pressure-responsive means actuated by the pressure of the gas from the valve to maintain the pressure of gas supplied to the nozzle below a predetermined value. The cutting gas control valve, most suitably of the normally closed spring-actuated type, is preferably disposed in a valve block, and the heating jet gas supply is controlled in any suitable manner. The pressure-responsive means may be placed in any suitable position on or as an accessory to the torch. Preferably such means comprises a normally open spring-actuated check, or regulating, valve disposed in the cutting gas conduit between the control valve and nozzle, and preferably interposed in the valve block between the outlet of the control valve and the cutting gas conduit. This regulating permits gas to pass to the nozzle from the control valve as long as its pressure is below a predetermined value, which will generally be that beyond which the jet is inefficient. When the control valve admits gas in excess of that pressure, the pressure of the gas actuates the regulating valve to reduce the flow of gas to the nozzle to the proper point. The regulating valve may, and preferably is, sealed after adjustment to prevent any accidental or intentional change of adjustment, thereby rendering it impossible for an operator to apply excessive cutting gas pressure.

Having reference now to the drawings, the torch shown comprises a nozzle 1, and a head 2 of the type provided with a mixing chamber, although other types of head may be used, and all of the nozzles and heads are in such common use as to require no further description. Connected to the head and extending to a base block 3 are separate cutting and heating gas pipes 4 and 4a, respectively, Fig. 1, pipe 4a lying below gas pipe 4 in the same plane. A tubular handle member 5 surrounds the pipes adjacent the base block. Cutting gas for the cutting jet passes to pipe 4 from a source of supply connected to a nipple 6 on block 3, the line pressure being regulated in any suitable manner, as by a reducing valve on the supply tank. The heating jet is formed from low pressure cutting gas drawn through valve 7 in block 3, and from fuel gas passed to the block through appropriate connections and valves. All of this construction, including that of the base block, is well known and will be readily understood by those skilled in the art.

The cutting gas control and regulating valve mechanism is preferably disposed in a valve block 8 interposed in pipe 4 between the nozzle and block 3, as shown in Fig. 1. Block 8 is provided with a transverse port or opening 9 for the control valve, communicating at its upper end with the line pressure side of pipe 4, and at its lower end with a longitudinal bore 10 extending to a regulating valve chamber 11, from which a continuation of pipe 4 extends to head 2. Opening 9 is provided with a tapered seat for a conical valve 12 as shown in Fig. 2, this valve being held in passage-closing position by the gas pressure and by a coiled spring 13 disposed between the valve head and a threaded plug 14 screwed into the upper end of opening 9, a gasket 15 being inserted between the plug and the block. Stem 16 of valve 12 extends downwardly into a bushing 17 disposed in the lower end of the opening, and a pin 18 aligned with the valve stem is inserted in the bore of the bushing for actuation of the valve. A packing gland 19 in the bushing, and a cap 20 having a central pin-receiving bore disposed over the outer end of the bushing, provide a pressure-tight joint. Pin 18 is movable by a trigger 21 pivotally connected at 22 to block 8, so that when the trigger is depressed pin 18 acts upon valve stem 16 and opens valve 12 to permit cutting gas to pass through opening 9 and bore 10 to chamber 11.

The automatic control mechanism provided according to the invention is disposed in chamber 11. As shown in Fig. 2, it preferably comprises a valve having a stem 23 provided at its lower end with longitudinal vanes 24, and with a circular base 25 forming a web between the ends of the vanes. These vanes make a sliding fit in the lower end of the chamber, and act as a guide to maintain the stem in proper alignment. Intermediate its ends the stem is provided with a collar 26, and a diaphragm packing 27 rests on the outer end of this collar and is firmly held in place by a threaded collar 28 engaging threads cut in the outer end of stem 23. The diaphragm seats on a shoulder 29 formed in the chamber, and is held in pressure-tight relation by a threaded bushing 30 screwed in the upper end of the chamber, a washer 31 being disposed between the bushing and diaphragm to prevent the periphery of the diaphragm from becoming excessively flexed. A circular plate 32 is disposed on the outer end of stem 23, and a coiled spring 33 is disposed between the plate and a threaded plug 34 engaging threads formed interiorly of the bushing. Plate 32 is preferably of approximately the diameter of the base of bushing 30, so as also to act as a guide for the upper end of stem 23. The valve is disposed to be normally open, the spring tension being adjusted by movement of plug 34 so as to move the valve towards and into passage closing position when the pressure of gas from bore 10 reaches a predetermined value.

In the operation of this torch appropriate cutting and fuel gas connections are made at the base block, oxygen being generally used as the cutting gas, and for the heating jet any suitable fuel gases can be used, such as acetylene, hydrogen, etc. The cutting gas valve is normally closed, so that this gas cannot flow to the nozzle until valve 12 is opened by manipulation of trigger 21. The heating jet is adjusted in the customary manner, and when the work has been heated to the kindling temperature, trigger 21 is depressed, which opens valve 12, and since the regulating valve is open, gas passes to the nozzle to form the cutting jet. The cutting gas flowing from valve 12 exerts its pressure against the regulating valve, which has been adjusted so as to reduce or shut off the flow of such gas to the nozzle when its pressure beyond the control valve attains or passes any desired value. The pressure at which the regulating valve is set to operate will be that at which the cutting jet is most efficient, and can of course be varied depending upon the requirements of setting. For example, with oxygen as the cutting gas, using acetylene as the fuel gas, the regulating valve may be adjusted to maintain the oxygen passing to the cutting jet of the nozzle below, say, 30 pounds per square inch pressure. Consequently, should the operator apply a line pressure in excess of that at which the regulating valve operates, the latter acts to limit the pressure at which the cutting gas flows through the nozzle to the pressure determined by the setting of the regulating valve.

In order to prevent accidental or intentional change of adjustment of the regulating valve, it is preferably sealed. This may suitably be accomplished in the manner shown in Fig. 2, in which the bushing 30 projects slightly beyond a nipple 36 integral with block 8, and an interiorly threaded cap 36 engages the exposed threads on the bushing, this cap being relatively flat and smooth-surfaced, so as not to be readily removable, thus preventing access to the spring tension adjusting plug 34. A central bore provided in the cap, and filled with sealing wax 37, permits access to a slot formed in the plug for adjustment. The use of a sealed bore in the cap, while not entirely preventing access to the plug, reduces the liability of unauthorized readjustments, and of course disturbance of the wax indicates that the torch has been tampered with.

Thus the invention provides a simple mechanism for a torch which automatically reduces the pressure of cutting gas supplied to the nozzle when the line pressure is excessive, and which is substantially tamper-proof. Consequently, the torch automatically provides substantial oxygen economy in practical operation as compared with all other torches, because it permits only the maximum desirable flow of cutting gas to the nozzle, and thus renders harmless the application of excessive line pressure. The torches are readily constructed, and existing torches may be readily modified to embody the invention.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim:

1. A cutting torch comprising in combination a nozzle adapted to deliver heating and cutting jets, separate conduits for supplying heating and cutting gas to the nozzle, a normally closed spring-actuated control valve in the cutting gas conduit, and a normally inadjustable spring-impelled regulating valve associated with the outlet of and actuated by the pressure of gas supplied from said control valve, said regulating valve being effective when the pressure of gas supplied from said control valve exceeds a predetermined pressure to maintain flow of gas to the nozzle continuously at said predetermined pressure.

2. A cutting torch comprising in combination a nozzle, a conduit for supplying cutting gas to the nozzle, a valve associated with said conduit for admitting cutting gas thereto, and pressure-responsive means effective between said valve and nozzle and actuated by the pressure of gas supplied from said valve for maintaining the flow of gas to the nozzle continuously at a predetermined value.

3. A cutting torch comprising in combination a nozzle adapted to deliver heating and cutting jets, a conduit for supplying cutting gas to the nozzle, and a valve in said conduit for admitting cutting gas thereto, and pressure-regulating means interposed in sealed adjustment in said conduit between said valve and nozzle and actuated by flow of gas in said conduit, said means being effective when the pressure of gas supplied from said valve exceeds a predetermined pressure to maintain the flow to the nozzle continuously at said predetermined pressure.

4. A cutting torch comprising in combination a nozzle adapted to deliver heating and cutting jets, a conduit for supplying cutting gas to the nozzle, a normally closed spring-actuated control valve in said conduit, and a normally open spring-actuated regulating valve associated with the outlet of said cutting gas valve and operable by the pressure of gas supplied from said cutting gas valve to maintain the flow of gas to the nozzle continuously at a predetermined pressure.

5. A cutting torch comprising in combination a nozzle adapted to deliver heating and cutting jets, a base block disposed in spaced relation to said nozzle, separate heating and cutting gas pipes connecting said block and nozzle, a valve block interposed in said cutting gas pipe between said base block and nozzle, a control valve in said valve block, and a normally open spring-actuated regulating valve disposed in sealed adjustment in said valve block between the outlet of said control valve and said cutting gas pipe and actuated by the pressure of gas supplied from said control valve to maintain flow of gas to the nozzle continuously at predetermined pressure when the pressure of said gas passed by said control valve exceeds said pressure.

In testimony whereof I sign my name.

JAMES D. McCUTCHEON.